Patented July 9, 1929.

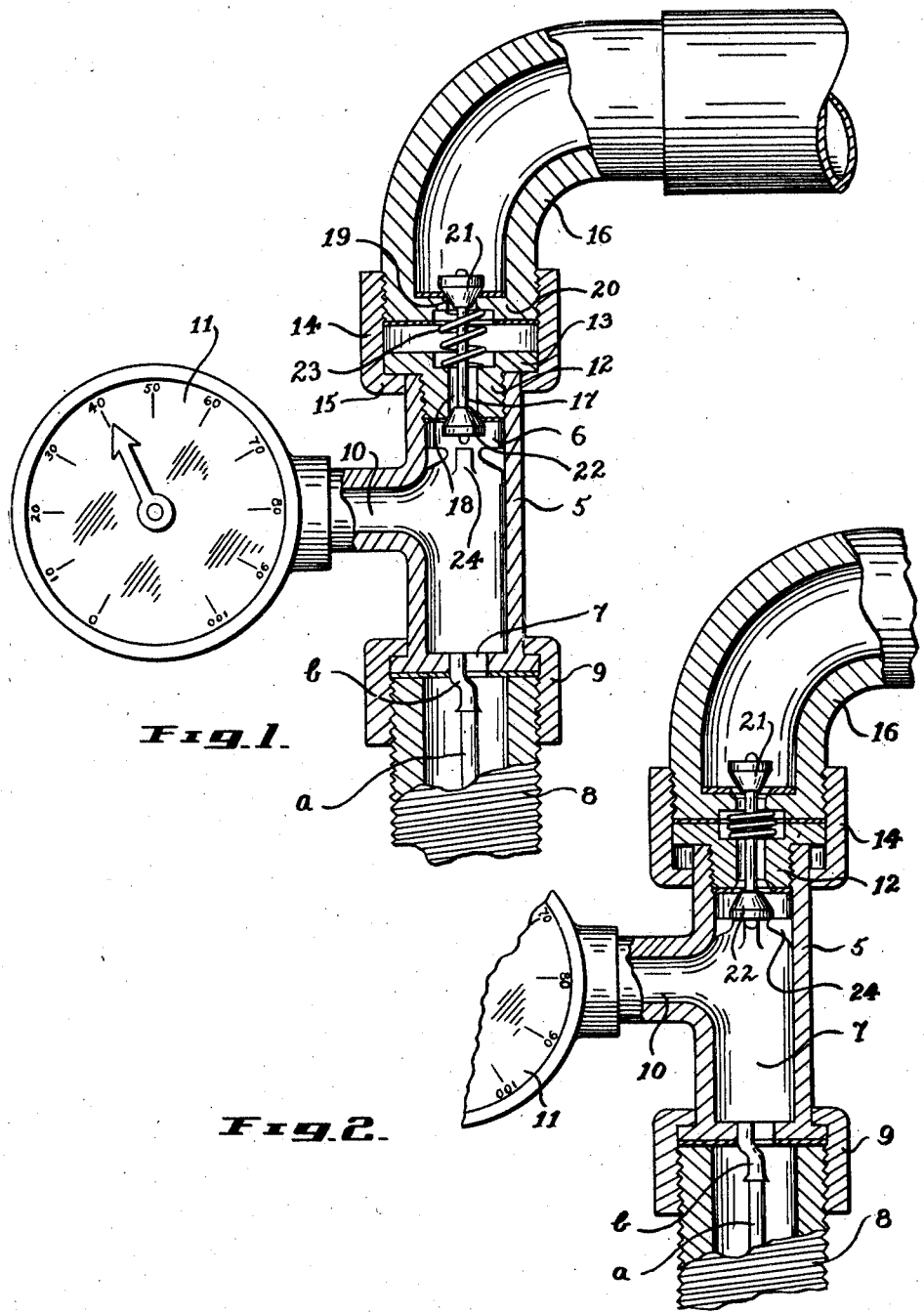

1,719,902

UNITED STATES PATENT OFFICE.

RUSSELL J. REANEY, OF OTTAWA, ONTARIO, CANADA, ASSIGNOR TO REANEY LIMITED, OF OTTAWA, CANADA.

VALVED NOZZLE FOR TIRE VALVES.

Application filed November 7, 1924. Serial No. 748,417.

This invention relates to improvements in a valved nozzle for tire valves adapted for measuring liquid pressure in general and appertaining more particularly to an accurate and dependable gauge, associated with the tire valve nozzle of an automobile tire pump or other air pressure supply, that is characterized by positive action and structural simplicity.

An object is to provide a valved air hose nozzle having a pressure gauge attached that will indicate the air pressure within the tire.

A further object is to provide a device of this character wherein the nozzle parts are permitted to assume two positions without removal from the tire valve nipple and thus two individual functions viz; the filling of the tire and the accurate reading of the pressure therein, may be performed.

To the accomplishment of these and related objects my invention resides in the construction, combination and arrangement of the several parts as will be hereinafter more fully described, illustrated in the accompanying drawings and pointed out in the claims hereunto appended.

In the drawings, forming a part of this disclosure, wherein like characters designate like parts throughout the several views, Fig. 1 is a side elevation, with parts shown in section, of an embodiment of the invention; and Fig. 2 is a similar elevation in which the movable parts have assumed a new position.

While the inventor is aware that various attempts have been made to introduce a gauge in the air pipe line, it is believed that these have proven unsatisfactory and have failed to successfully meet the need. This has resulted mainly from the fact that a pressure gauge so interposed in the air supply line or the hose coupling has been unfavorably affected by the pressure of the pump or tire supply which is higher than that actually existing within the air so the reading of the gauge is inaccurate and deceptive as to the actual pressure in the tire at that time.

My invention is designed to overcome this fault, provision being made to render the impulses of the pump or air supply pressure ineffective to the gauge by normally isolating it or the pressure supply at the time of taking the gauge readings.

To this end the device comprises a nozzle body 5 or valve casing member having an air inlet 6 and an outlet 7 which connects with the casing stem 8 of the tire valve in the usual way, a sliding collar 9, threaded to receive the valve casing stem 8, being shown for purposes of illustration. A port 10 from the nozzle 5 communicates with the fluid pressure gauge 11.

The inlet end of the nozzle body 5 is interiorly threaded to receive a plug 12 the flanged top 13 of which projects substantially beyond the perimeter of the nozzle body 5 and so retains the coupling 14 whose interiorly flanged lower end 15 is engaged thereby. The end of the coupling remote from the flange 15 is threaded to receive an elbow or other pipe 16 on the end of the air supply or pump hose.

From the foregoing description it will be apparent that the pipe 16 and nozzle body 5 are slidingly united by the coupling 14 threaded to the said pipe 16 and retained on the nozzle body by the flanged plug 12. It is within these parts that are disposed the valve and valve fittings that enable my invention to successfully perform the intended functions.

A stem or rod 17 extends through an axial perforation 18 in the plug 12 and passes on through a registering opening 19 in the closed end 20 of the pipe 16. Oppositely facing conical valves 21 and 22 on the ends of this stem 17 seat in the top of the closed end 20 of pipe 16 and the bottom of plug 12 respectively which parts are normally held apart and the valves accordingly closed by a coil spring 23 interposed therebetween and surrounding the said stem 17.

The sliding movement permitted by the coupling 14 is sufficient to unseat these two valves 21 and 22 thus providing a through passage from the pipe 16 to the nozzle body 5. But; for fear of only the lower valve 22 unseating; the upper valve 21 being held closed by pressure from the source; projections 24 from the walls of the nozzle 5 are provided to halt the descent of the valve carrying stem 17 thereby forcing the upper valve 21 to unseat when the coupling is depressed a greater distance than that normally existing between the bottom of the lower valve 22 and the top of the projections 24.

In operation, the union of the pipe 16 and nozzle 5 is normally spread and the valves 21 and 22 closed by the action of the interposed coil spring 23, but in addition, if this nozzle is attached to an air pressure reservoir, the valve 21 seating in the end 20 of the air pipe line will be closed on account of the pressure on it: The collar 9 is applied to the valve casing stem 8 which automatically depresses the valve plunger "a" by means of a contact pin "b" that is carried by the nozzle 5: Any pressure in the tire is then registered on the gauge (see Fig. 1): If the pressure is found to be low, the pipe 16 is pressed down on the nozzle as provided for by the coupling 12, thus unseating the closed valves 21 and 22 and allowing the air to enter the tire: The gauge will now be registering the mean pressure between that in the supply reservoir and the tire which reading is of no value (see Fig. 2): As the tire is inflated to approximately the pressure desired the pipe 16 is allowed to rise, assuming the position shown in Fig. 1, thus shutting off the supply and the gauge will indicate the exact pressure existing within the tire. Or, in brief, the depressing of the pipe or air feed line inflates the tire and the raising of it (or allowing the parts of the union to separate themselves) shuts off the supply and allows of the taking of an accurate reading of the pressure gauge.

The foregoing description and the drawings have reference to what may be considered the preferred or approved form of my invention. It is to be understood, however, that in adapting the same to meet different conditions, I may make such changes in construction, arrangement and combination of parts, materials, dimensions etc., as may prove expedient and fall within the scope of the appended claims.

What I claim as new is:—

1. A valve structure including a valve casing member for mounting on the casing stem of a tire valve; a reciprocating valve stem working in said member; a pair of valves mounted on said valve stem and adapted normally to be seated together; said casing member having a seat for one of the valves, said valves being also arranged so that both may be unseated; and an air hose connecting section having connection with said member and having a seat for the other of said valves and adapted to be moved relative to said member to operate said valves.

2. A valve structure including a valve casing member for mounting on the casing stem of a tire valve; a pair of valves; said casing member having a seat for one of the valves, a single stem for said pair of valves reciprocating in said member; and a second member having connection with the first mentioned member and having a seat for the other of said valves and adapted to be moved relative to the first mentioned member to operate said valves, said valves being normally seated.

In testimony whereof I hereunto affix my signature.

RUSSELL J. REANEY.